US012555005B2

(12) United States Patent
Briscoe et al.

(10) Patent No.: US 12,555,005 B2
(45) Date of Patent: Feb. 17, 2026

(54) ARTIFICIAL INTELLIGENCE BASED CONFIGURE PRICE QUOTE RECOMMENDATION SYSTEM

(71) Applicant: Oracle International Corporation, Redwood Shores, CA (US)

(72) Inventors: Jennifer Jo Briscoe, Centennial, CA (US); Arvind Srinivasamoorthy, Clarksburg, MD (US); Naveen Nahata, North Brunswick, NJ (US); Christopher Emmett Bales, Bend, OR (US); Gaurav Umeshkumar Gupta, Thane (IN); Maximilian Froeschl, Munich (DE)

(73) Assignee: Oracle International Corporation, Redwood Shores, CA (US)

( * ) Notice: Subject to any disclaimer, the term of this patent is extended or adjusted under 35 U.S.C. 154(b) by 1406 days.

(21) Appl. No.: 17/167,281

(22) Filed: Feb. 4, 2021

(65) Prior Publication Data

US 2022/0245484 A1 Aug. 4, 2022

(51) Int. Cl.
| | |
|---|---|
| *G06N 5/04* | (2023.01) |
| *G06F 30/13* | (2020.01) |
| *G06N 20/00* | (2019.01) |
| *G06Q 30/06* | (2023.01) |
| *G06Q 30/0601* | (2023.01) |

(52) U.S. Cl.
CPC .............. *G06N 5/04* (2013.01); *G06F 30/13* (2020.01); *G06N 20/00* (2019.01); *G06Q 30/0611* (2013.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 11,132,735 B2* | 9/2021 | Sivan | G06Q 20/203 |
| 11,216,496 B2* | 1/2022 | Duffy | G06F 16/2455 |
| 2020/0320607 A1* | 10/2020 | Beauchamp | G06Q 30/0631 |

OTHER PUBLICATIONS

Hyunwoo, "Recommendation system development for fashion retail e-commerce" (Year: 2018).*

* cited by examiner

*Primary Examiner* — Van C Mang
(74) *Attorney, Agent, or Firm* — Invoke

(57) ABSTRACT

Techniques for suggesting a candidate layout based on historical characteristics are disclosed. A system trains a machine learning model to suggest layouts for three-dimensional spaces. The system obtains sets of historical characteristic data, including spatial characteristics of a particular three-dimensional space and layout characteristics including information indicating items present in the particular three-dimensional space and positioning information indicating a position of each item within the particular three-dimensional space. The system trains the machine learning model based on the sets of historical characteristic data. The system receives a first request for a layout suggestion from a first user, including at least a first set of spatial characteristics for a first three-dimensional space. The system applies the machine learning model to the first set of spatial characteristics to identify a first candidate layout as a suggestion and, based on the applying operation: recommends the first candidate layout as a layout suggestion.

20 Claims, 7 Drawing Sheets

ARTIFICIAL INTELLIGENCE BASED CONFIGURE PRICE QUOTE RECOMMENDATION SYSTEM

TECHNICAL FIELD

The present disclosure relates to configure price quote (CPQ) systems. In particular, the present disclosure relates to a machine learning model for recommending item configurations based on one or more characteristics of search results previously selected by a user.

BACKGROUND

Configure, price quote (CPQ) software is a term used to describe software systems that help sellers quote complex and configurable products. If the product is highly configurable, the user may face combinatorial explosion meaning that there may be a vast number of possible configurations. This causes a rapid growth of the complexity of selecting a configuration that is optimal or most appropriate for a particular customer. Thus a configuration engine may be employed to alleviate this problem. The configuration engine may be a constraint satisfaction engine, which can maintain a full set of configuration rules to alleviate the problem of combinatorial explosion. However, such systems are complex and difficult to maintain, as rules have to be written to accommodate each configuration. Alternatively, the configuration engine may be a compile-based configurator. These configurators build upon constraint-based engines and research in Binary Decision Diagrams. This approach compiles all possible combinations in a single distributable file and is agnostic to how rules are expressed by the author. This enables a user to import rules from legacy systems and handle increasingly more complex sets of rules and constraints tied to increasingly more customizable products.

Customers often appreciate being able to see or otherwise visualize a product prior to purchasing the product. Extended reality systems can be useful for visualizing products that have not yet been built, such as customizable products. Extended reality refers to any real-and-virtual combined environment, including augmented reality, mixed reality, and virtual reality systems. All extended reality systems may be used to view a three-dimensional rendering of a particular object. Moreover, augmented reality and mixed reality systems may be used to show the particular object as if it were in the real world by overlaying a rendering of the object on an image from the real world.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
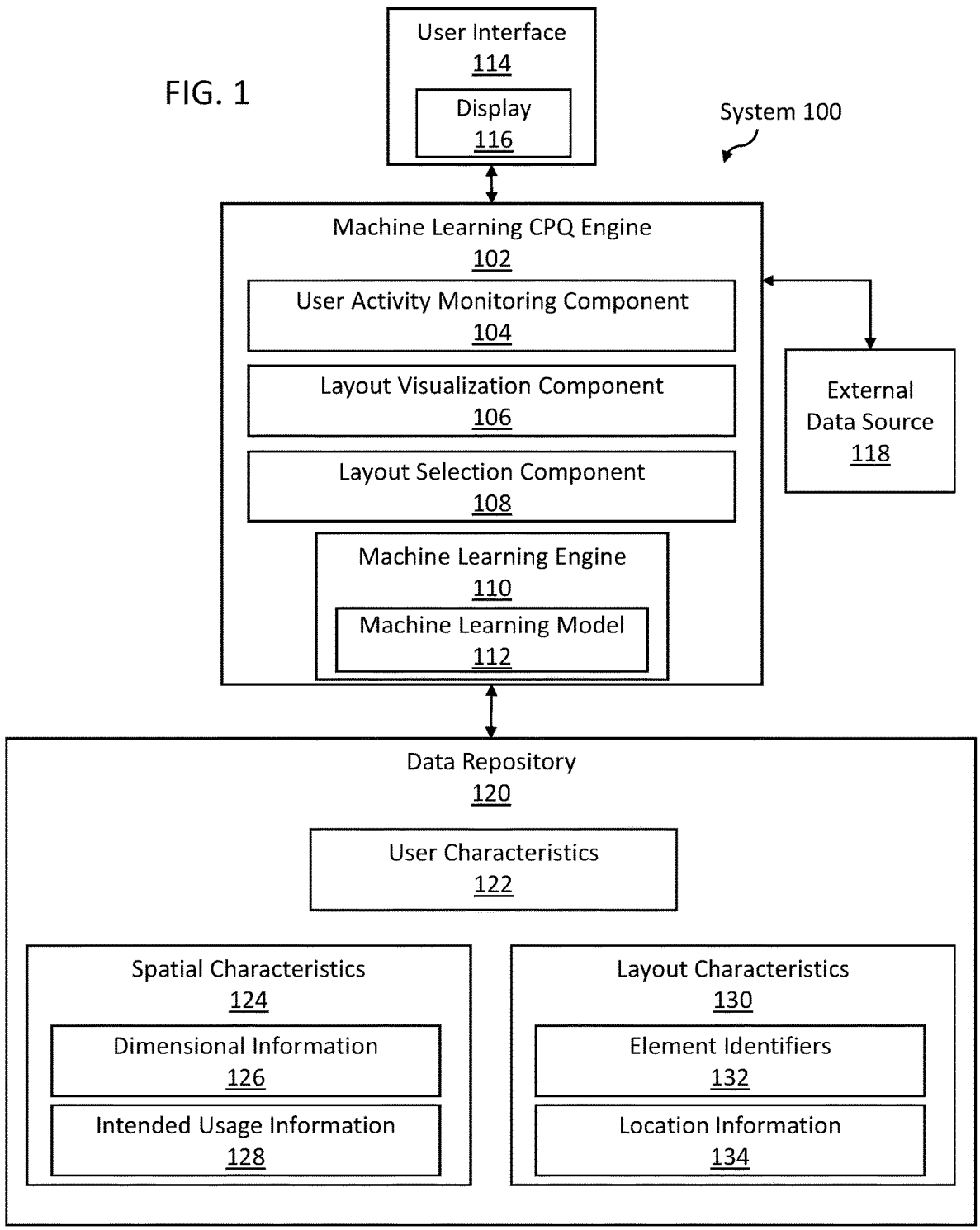
FIG. 1 illustrates a system for suggesting a candidate layout based on historical spatial characteristics in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MACHINE LEARNING CONFIGURE PRICE QUOTE SYSTEM
3. SUGGESTING A CANDIDATE LAYOUT BASED ON HISTORICAL SPATIAL CHARACTERISTICS
4. EXAMPLE EMBODIMENT
5. MISCELLANEOUS; EXTENSIONS
6. HARDWARE OVERVIEW

1. General Overview

One or more embodiments implement a machine learning model that recommends a layout for a three-dimensional space. The system may train the machine learning model based on historical data of various three-dimensional spaces. Each set of historical data may include spatial characteristics of a particular three-dimensional space and characteristics of a layout selected for the particular three-dimensional space. The trained machine learning model may recommend a layout of structural elements and non-structural elements based on the characteristics of the three-dimensional space. The machine learning model interfaces with and/or integrates into a configure price quote (CPQ) system to price and quote a recommended layout. As examples, the system may recommend a layout for a food truck, a building, an automobile, or any other three-dimensional space.

The system may recommend a layout for a target three-dimensional space based on a subset of historical data for layout selections of other three-dimensional spaces. The subset of historical data may be selected based on similarities with the target three-dimensional space. The system may select subsets of historical data associated with:

three-dimensional spaces of the same dimension as the target three-dimensional space three-dimensional spaces for the same purpose/function as the target three-dimensional space three-dimensional spaces used by the user as the target three-dimensional space three-dimensional spaces used by users that share characteristics with the user of the target three-dimensional space In an example, a machine-learning CPQ system monitors behavior of one or more users when configuring a three dimensional space. Based on the monitoring, the system learns about user preferences such as size of walkways, size of workspace, type of equipment, etc. for three dimensional spaces generally, three dimensional spaces of a particular size (e.g., a food truck), and/or three dimensional spaces for a particular purpose (e.g., an ice cream truck, a pizza truck). The system may learn that a user selected a particular oven which increases workspace. The system may learn that a user rearranged equipment so that pieces of equipment that are intended to be used together are within a certain proximity of each other. The system may learn that particular equipment is associated with a three-dimensional space used for a particular purpose (e.g., an ice cream machine in an ice cream truck, a wood-fired oven in a pizza truck). Based on the learned user preferences, the CPQ system generates a recommendation of structural and/or non-structural items for inclusion within the three dimensional space and locations for each of the recommended items for a user that is currently configuring a 3-dimensional space using a CPQ system.

The CPQ system may pre-populate a virtual three dimensional space with the recommended set of structural and/or non-structural elements, in their recommended locations. A user may view and/or interact with the virtual three dimensional space via an extended reality application to review the recommendation. A system may update the proposal based on user modifications of the recommended set of elements based on a user's own interactions within the virtual three dimensional space or other considerations. Moreover, the system may monitor the users' behavior when interacting with the virtual three dimensional space. The system may learn that certain ceiling-installed equipment is removed when the user walks within the three dimensional space and realizes the equipment would require ducking to walk through the space. Based on the learned user preferences, the CPQ system generates recommendations for a user that is currently configuring a 3-dimensional space using a CPQ system.

One or more embodiments described in this Specification and/or recited in the claims may not be included in this General Overview section.

2. Machine Learning Configure Price Quote System

FIG. 1 illustrates a system 100 in accordance with one or more embodiments. As illustrated in FIG. 1, system 100 includes a machine learning configure price quote (CPQ) engine 102, a user interface 114, an external data source 118, a data repository 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 114 refers to hardware and/or software configured to facilitate communications between a user and the search and filter engine 102. The user interface 114 may be used by a user who accesses an interface (e.g., a dashboard interface) for work and/or personal activities. The user interface 114 may be associated with one or more devices for presenting visual media, such as a display 116, including an extended reality display, a monitor, a television, a projector, and/or the like. User interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 114 are specified in different languages. The behavior of user interface elements is specified in a runtime-generated programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 114 is specified in one or more other languages, such as Java, C, or C++.

In one or more embodiments, a machine learning CPQ engine 102 refers to hardware and/or software configured to perform operations described herein for performing configuration and layout selection operations based at least in part on spatial characteristics of a three dimensional space to be configured. Examples of operations for performing the configuration and layout selection are described below with reference to FIGS. 2 and 3.

In an embodiment, the machine learning CPQ engine 102 includes a user activity monitoring component 104. A user activity monitoring component 104 may refer to hardware and/or software configured to perform operations described herein (including such operations as may be incorporated by reference) for recognizing input from a user.

In an embodiment, the machine learning CPQ engine 102 includes a layout visualization component 106. The layout visualization component 106 may refer to hardware and/or software configured to create a visualization of a layout of a virtual three dimensional space.

In an embodiment, the machine learning CPQ engine 102 includes a layout selection component 108. The layout selection component 108 may refer to hardware and/or software configured to select a layout for a three dimensional space.

In an embodiment, one or more components of the machine learning CPQ engine 102 use a machine learning engine 110. Machine learning includes various techniques in the field of artificial intelligence that deal with computer-implemented, user-independent processes for solving problems that have variable inputs.

In some embodiments, the machine learning engine 110 trains a machine learning model 112 to perform one or more operations. Training a machine learning model 112 uses training data to generate a function that, given one or more inputs to the machine learning model 112, computes a corresponding output. The output may correspond to a prediction based on prior machine learning. In an embodiment, the output includes a label, classification, and/or categorization assigned to the provided input(s). The machine learning model 112 corresponds to a learned model for performing the desired operation(s) (e.g., labeling, classifying, and/or categorizing inputs). The machine learning CPQ engine 102 may use multiple machine learning engines 110 and/or multiple machine learning models 112 for different purposes.

In an embodiment, the machine learning engine 110 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 110 receives positive and/or negative reinforcement in the process of attempting to solve a particular problem (e.g., to optimize performance in a particular scenario, according to one or more predefined performance criteria). In an embodiment, the machine learning engine 110 initially uses supervised learning to train the machine learning model 112 and then uses unsupervised learning to update the machine learning model 112 on an ongoing basis.

In an embodiment, a machine learning engine 110 may use many different techniques to label, classify, and/or categorize inputs. A machine learning engine 110 may transform inputs into feature vectors that describe one or more properties ("features") of the inputs. The machine learning engine 110 may label, classify, and/or categorize the inputs based on the feature vectors. Alternatively or additionally, a machine learning engine 110 may use clustering (also referred to as cluster analysis) to identify commonalities in the inputs. The machine learning engine 110 may group (i.e., cluster) the inputs based on those commonalities. The machine learning engine 110 may use hierarchical clustering, k-means clustering, and/or another clustering method or combination thereof. In an embodiment, a machine learning engine 110 includes an artificial neural network. An artificial neural network includes multiple nodes (also referred to as artificial neurons) and edges between nodes. Edges may be associated with corresponding weights that represent the strengths of connections between nodes, which the machine learning engine 110 adjusts as machine learning proceeds. Alternatively or additionally, a machine learning engine 110 may include a support vector machine. A support vector machine represents inputs as vectors. The machine learning engine 110 may label, classify, and/or categorizes inputs based on the vectors. Alternatively or additionally, the machine learning engine 110 may use a naïve Bayes classifier to label, classify, and/or categorize inputs. Alternatively or additionally, given a particular input, a machine learning model may apply a decision tree to predict an output for the given input. Alternatively or additionally, a machine learning engine 110 may apply fuzzy logic in situations where labeling, classifying, and/or categorizing an input among a fixed set of mutually exclusive options is impossible or impractical. The aforementioned machine learning model 112 and techniques are discussed for exemplary purposes only and should not be construed as limiting one or more embodiments.

For example, the machine learning engine 110 may receive, as inputs, user characteristic information and/or spatial characteristic information. The machine learning engine 110 may associate one or more candidate layouts with the input user characteristic information. Alternatively or additionally, the machine learning engine 110 may associate one or candidate layouts with the input spatial characteristic information. In embodiments, the one or more candidate layouts associated with the spatial characteristic information and/or user characteristic information may be selected from a defined set of candidate layouts.

In an embodiment, as a machine learning engine 110 applies different inputs to a machine learning model 112, the corresponding outputs are not always accurate. As an example, the machine learning engine 110 may use supervised learning to train a machine learning model 112. After training the machine learning model 112, if a subsequent input is identical to an input that was included in labeled training data and the output is identical to the supervisory signal in the training data, then output is certain to be accurate. If an input is different from inputs that were included in labeled training data, then the machine learning engine 110 may generate a corresponding output that is inaccurate or of uncertain accuracy. In addition to producing a particular output for a given input, the machine learning engine 110 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the machine learning CPQ engine 102 is configured to receive data from one or more external data sources 118. An external data source 118 refers to hardware and/or software operating independent of the search and filter engine 102. For example, the hardware and/or software of the external data source 118 may be under control of a different entity (e.g., a different company or other kind of organization) than an entity that controls the search and filter engine.

In an embodiment, the machine learning CPQ engine 102 is configured to retrieve data from an external data source 118 by 'pulling' the data via an application programming interface (API) of the external data source 118, using user credentials that a user has provided for that particular external data source 118. Alternatively or additionally, an external data source 118 may be configured to 'push' data to the machine learning CPQ engine 102 via an API of the interface creation engine, using an access key, password, and/or other kind of credential that a user has supplied to the external data source 118. The machine learning CPQ engine 102 may be configured to receive data from an external data source 118 in many different ways.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the search and filter engine 102 and/or the external data source 118. Alternatively or additionally, a data repository 120 may be implemented or executed on a computing system separate from the machine learning CPQ engine 102 and/or the external data source 118. A data repository 120 may be communicatively coupled to the machine learning CPQ engine 102 and/or the external data source 118 via a direct connection or via a network.

User characteristic information 122 may be implemented across any of components within the system 100. However, this information is illustrated within the data repository 120 for purposes of clarity and explanation. The user characteristic information 122 may include a user identifier (e.g., a used ID). the user characteristic information may include, for example, physical characteristics of the user, such as height, weight, and shoulder width. Many user characteristics may be stored.

Spatial characteristic information 124 may be implemented across any of components within the system 100. However, this information is illustrated within the data repository 120 for purposes of clarity and explanation. As illustrated in FIG. 1, the spatial characteristic information 124 may include dimensional information 126 associated with a three dimensional space and intended usage information 128 for the three dimensional space. Many spatial characteristics may be stored.

The dimensional information 126 may be information indicating physical dimensions of the three dimensional space. As an example, the dimensional information may include interior and/or exterior dimensions of a structure that includes the three dimensional space. The intended usage information 128 may comprise information including a particular use of the space. As examples, the intended usage information may include a category (e.g., passenger vehicle, food truck) and/or a specific purpose (e.g., ice cream truck, pizza truck).

Layout characteristic information 130 may be implemented across any of components within the system 100. However, this information is illustrated within the data repository 120 for purposes of clarity and explanation. As illustrated in FIG. 1, the layout characteristic information 130 may include, for each structural and/or non-structural element included in the layout, an element identifier and location information associated with the element. Many layout characteristics may be stored.

The element identifier 132 may include, for example, an alphanumeric identifier that indicates a particular structural or non-structural element. The element identifier may be used for retrieving information associated with the element. The location information 134 may include a location within the three dimensional space at with the structural or non-structural element is disposed.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
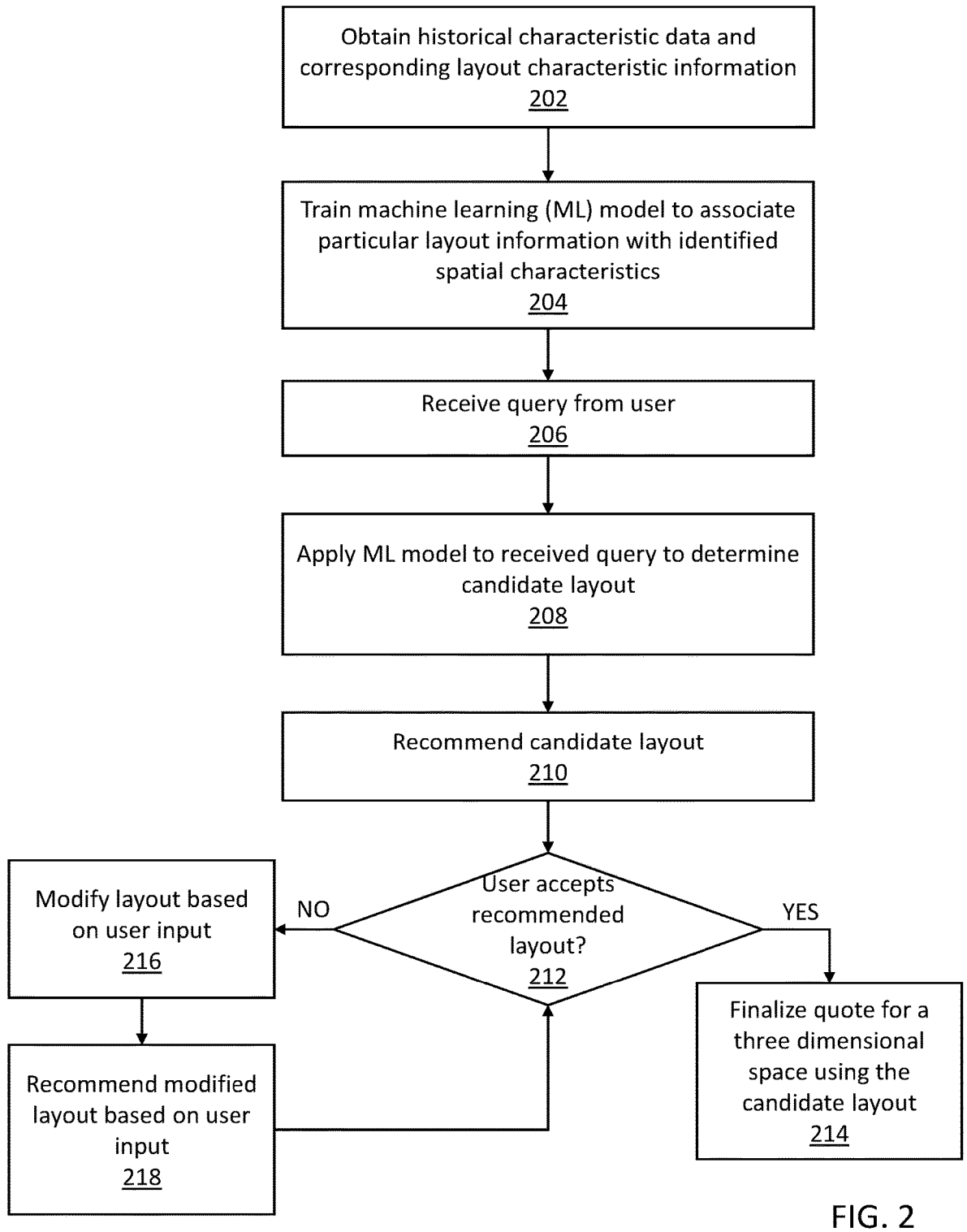
FIG. 2 illustrates an example set of operations for suggesting a candidate layout based on historical spatial characteristics in accordance with one or more embodiments.

3. Suggesting a Candidate Layout Based on Historical Spatial Characteristics FIG. 2 illustrates an example set of operations for suggesting candidate layout based on past spatial and selected layout characteristics. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments obtain historical characteristic data and associated layout characteristic information (Operation 202). The historical characteristic data obtained may include historical spatial characteristic data and associate layout characteristic data. As an example, the spatial characteristic data may include, for example, a size of a three dimensional space being laid out (e.g., 18 feet long, 7.5 feet wide, 7 feet high) and intended usage information (e.g. pizza truck). Layout characteristic data may include, for each element added to the space, an element identifier and an element location within the three dimensional space.

In embodiments, the historical spatial characteristic data and the layout characteristic data may include data from only one particular user (e.g., a current user). That is, the system may retrieve previously-configured spaces from the user to better allow the user to configure a new space in a similar manner. Alternatively, the historical spatial characteristic data and the associated layout characteristic data may include data from multiple users that exceed a similarity threshold with the current user, or may include all users of a system.

Determining that a user exceeds a similarity threshold with the current user may include receiving, for each layout, a set of one or more physical characteristics associated with the user that created the layout. The system may determine that the user associated with the layout exceeds a similarity threshold based on a comparison of the physical characteristics of the user with physical characteristics of the current user.

The system may train one or more machine learning (ML) models to associate particular layout information with one or more particular spatial characteristics (Operation 204). The ML model may be trained using at least a subset of the received spatial characteristics. For example, responsive to one or more users frequently selecting a particular oven and oven location within a three dimensional space of a particular size, the system may associate the particular size of space with the particular oven and oven location. Alternatively, responsive to one or more users repeatedly selecting a wood fired oven for a three dimensional space having the intended usage information of "pizza truck," the system may associate the usage information "pizza truck" with the particular wood fired oven.

The system may receive a query as input from a user (Operation 206). The input query may include one or more spatial characteristics of a three dimensional space the user seeks to configure. For example, the query may include spatial dimensions of the three dimensional space and/or intended usage information for the three dimensional space.

The system may apply the trained a trained ML model (e.g., a first ML model) to the received query to determine a candidate layout (Operation 208). Applying the trained ML model to the query includes determining the one or more spatial characteristics associated with the input query and using at least a subset of the determined spatial characteristics of the query as an input to the trained ML model and receiving, as output, an identification of a candidate layout associated with the user input. In embodiments, the candidate layout identified by the ML model may be selected from a defined set of candidate layouts. In embodiments, the candidate layout may be selected based on various characteristics of the historical layout selections, including layouts for three-dimensional spaces of the same (or similar) dimension as the target three-dimensional space, layouts for three-dimensional spaces having the same (or similar) purpose/function as the target three-dimensional space, layouts for three-dimensional spaces used by the same user as the target three-dimensional space (e.g., the current user), or layouts for three-dimensional spaces used by users that share one or more characteristics with the user of the target three-dimensional space.

The system may present the candidate layout to the user (Operation 210). Presenting the layout may include, for example, presenting a visual and/or textual depiction of the layout. For example, presenting the layout may include presenting the user with at least a list of structural and/or non-structural elements to be included in the layout. In embodiments, location information for the structural and/or nonstructural elements may also be included. In some embodiments, presenting the layout may include presenting additional information associated with the layout. For example, additional information may include a cost associated with the layout and/or a delivery time associated with the layout.

In embodiments, the system may present a visualization of the three dimensional space configured according to the candidate layout to the user. Presenting the visualization may comprise rendering a virtual three dimensional space and displaying the virtual three dimensional space to the user via an extended reality display device. Alternatively, the visualization may comprise a three-dimensional rendering of the three dimensional space configured according to the candidate layout and presented on a display device such as a monitor, a smartphone, or a tablet computer.

The system may determine whether the user accepts the candidate layout (Operation 212). In embodiments, accepting the candidate layout may comprise receiving an indication of acceptance from the user. Accepting the candidate layout may be performed by the user clicking or otherwise activating a particular link.

In some embodiments, determining whether the user accepts the candidate layout may include monitoring user interactions with the presented visualization of the three dimensional space. For example, the system may determine that the user consistently tries to duck underneath equipment mounted on a ceiling of the structure, or turns sideways to fit through a narrow passage. Based on the user behavior, the system may propose one or more modifications to the candidate layout. The one or more proposed modifications may include, for example, one or more of removing one or more elements from the layout, adding one or more elements to the layout, or adjusting a location of one or more elements in the layout. For example, based on the user ducking to avoid a ceiling-mounted element, the system may propose to relocate or remove the ceiling-mounted element. As another example, responsive to a user turning sideways to fit through a narrow passage, the system may propose to replace one or more elements with smaller elements that would allow for a wider walkway.

In response to determining that the user accepts the candidate layout (YES in Operation 212), the system may finalize a quote for a three dimensional space using the candidate layout (Operation 214). Finalizing the quote may comprise, for example, calculating a cost for the user to purchase a three dimensional space configured according to the accepted layout. The system may place an order for one or more elements included in the layout. Finalizing the quote may comprise causing a three dimensional space to be configured according to the candidate layout. In embodiments, the three dimensional space may be, for example, a food truck, a passenger vehicle, and/or a building. There are many three dimensional spaces that can be configured.

In embodiments, the system may present a visualization of the three dimensional space in response to acceptance of the candidate layout. Presenting the visualization may comprise rendering a virtual three dimensional space and displaying the virtual three dimensional space to the user via an extended reality display device. Alternatively, the visualization may comprise a three-dimensional rendering of the three dimensional space configured according to the candidate layout and presented on a display device such as a monitor, a smartphone, or a tablet computer.

Alternatively, in response to determining that the user does not accept the candidate layout (NO in Operation 212), the system may modify the candidate layout (Operation 216). Determining that the user does not accept the user query may include receiving an indication that the user has changed one or more structural and/or non-structural elements of the candidate layout. Modifying the candidate layout may comprise one or more of removing one or more elements from the layout, adding one or more elements to the layout, or adjusting a location of one or more elements in the layout. The system may modify the layout based on the user input.

In embodiments, the indication that the user has changed one or more elements may include a user input specifying an adjustment to a size of a particular element. The user input may comprise, for example, a user selecting a size from a pre-populated list of available sizes, or selecting a size via a continuously variable selection mechanism (e.g., a slider). Responsive to receiving the request to adjust the size, the system may select an element similar to the particular element, but having a size that most closely matches the size selected by the user. For example, the particular item may be associated with an item category. In particular, if the particular item is a griddle, the griddle may be associated with eh category of "flat-top grills;" the system may select another item from the category of flat-top grills as being similar to the particular item. The system may recommend a modification to the layout that includes replacing the particular item with the selected similar item.

In embodiments, the system may further propose one or more additional modifications based on the user input. The system may propose one or more modifications based on the modification received from the user in Operation 216. The one or more proposed modifications may include, for example, one or more of removing one or more elements from the layout, adding one or more elements to the layout, or adjusting a location of one or more elements in the layout. As a particular example, a user may select a larger air conditioner for a space. The system may determine that a generator present in the space does not provide enough power for the larger air conditioner, and recommend a larger generator. The candidate layout The system may recommend a modified layout based on the received user input (Operation 218). Presenting the layout may include, for example, presenting a visual and/or textual depiction of the layout. For example, presenting the layout may include presenting the user with at least a list of structural and/or non-structural elements to be included in the layout. In embodiments, location information for the structural and/or nonstructural elements may also be included. In some embodiments, presenting the layout may include presenting additional information associated with the layout. For example, additional information may include a cost associated with the layout and/or a delivery time associated with the layout. The system then returns to Operation 212 to determine if the user accepts the presented layout (YES in Operation 212), or proposes additional modifications (NO in Operation 212).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
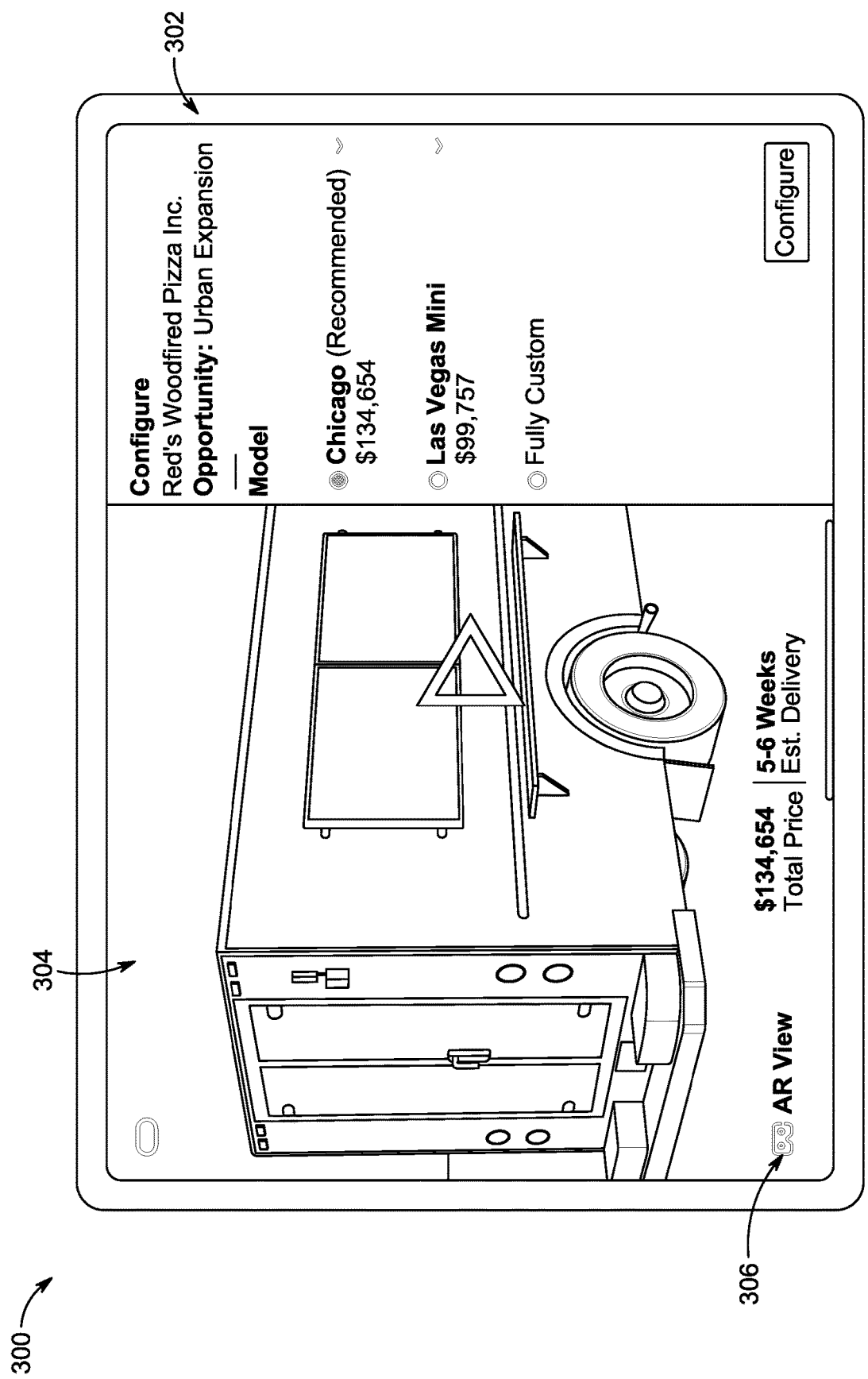
FIGS. 3A-3D show an example of a system for suggesting a candidate layout based on historical spatial characteristics in accordance with one or more embodiments.

FIG. 3A shows an example machine learning configure price quote (CPQ) system including a tablet computer interface 300. The machine learning CPQ system receives, from the user, a request to configure a three dimensional space embodied in a food truck, including a description of the food truck (e.g., a woodfired pizza truck for Red's Woodfired Pizza, Inc.) and a selection of a food truck model having particular dimensions. That is, the system allows the user to enter spatial characteristics for a three dimensional space, and applies a machine learning model to the received characteristics to determine a candidate layout to suggest to the user. As shown in FIG. 3A, the interface 300 includes an input area 302 that allows the user to make selections, a preview area 304 that shows a rendering that depicts the three dimensional space configured according to the currently selected layout. The rendering displayed in the preview area 304 may include a video that shows the rendering from multiple angles, for example by panning around the rendered space. As shown in FIG. 3A, the preview area may include a triangular play icon that begins playback of the video. Alternatively, the video may begin playback automatically. The interface 300 may further include an augmented reality control 306 that causes the machine learning CPQ system to display the three dimensional space configured according to the currently selected layout in an augmented reality display.

Figure 3B:
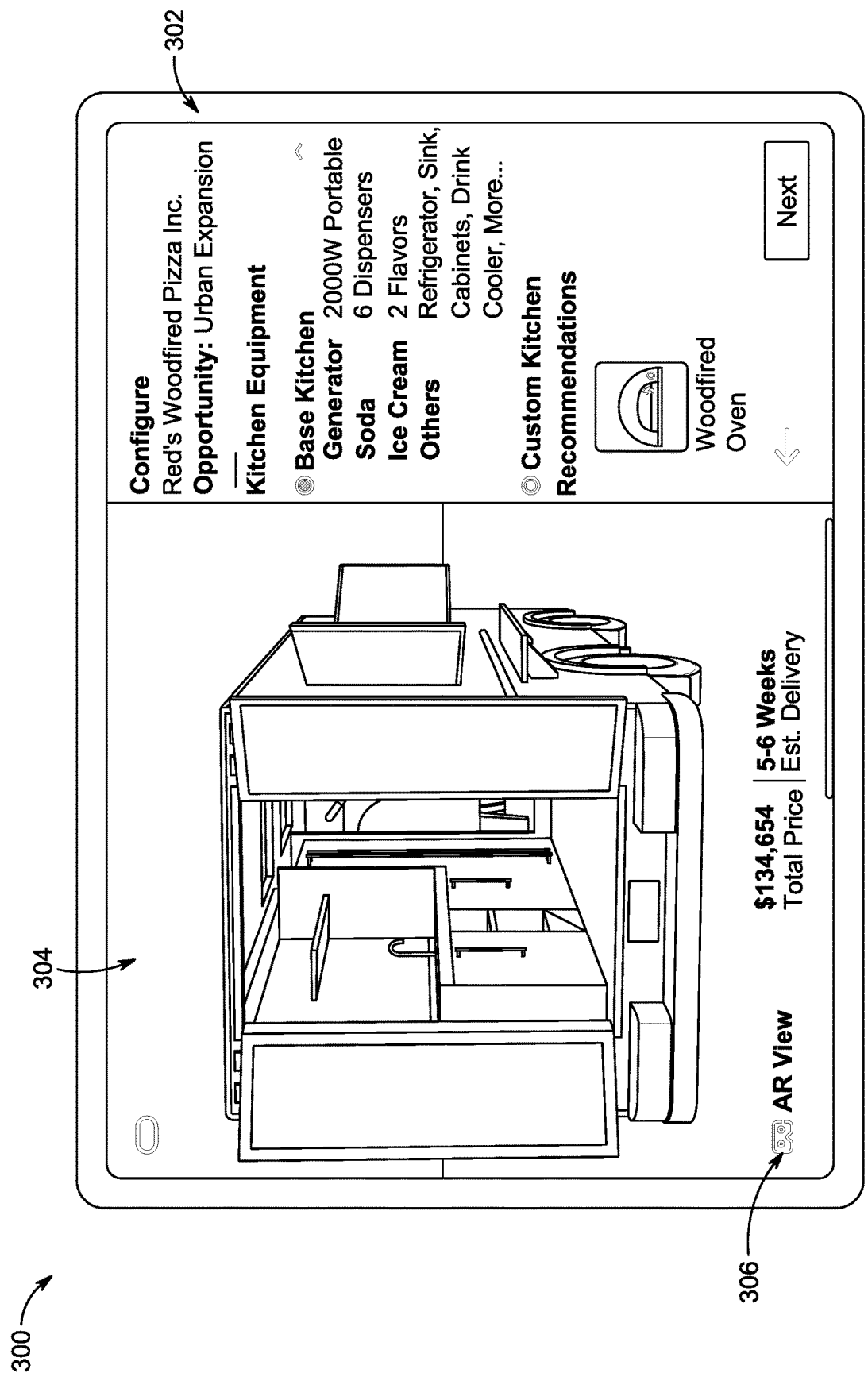

As shown in FIG. 3B, the system provides a candidate layout for the food truck in the input area 302. In particular, based on the spatial characteristics provided by the user (e.g., the food truck model and the usage information that the food truck will be used for woodfired pizza), the system determines, based on application of the machine learning model, that a candidate layout including a woodfired oven should be suggested, and displays the suggested candidate layout options in the input area 302. The user can approve the candidate layout or make additional selections or modifications to the layout.

Figure 3C:
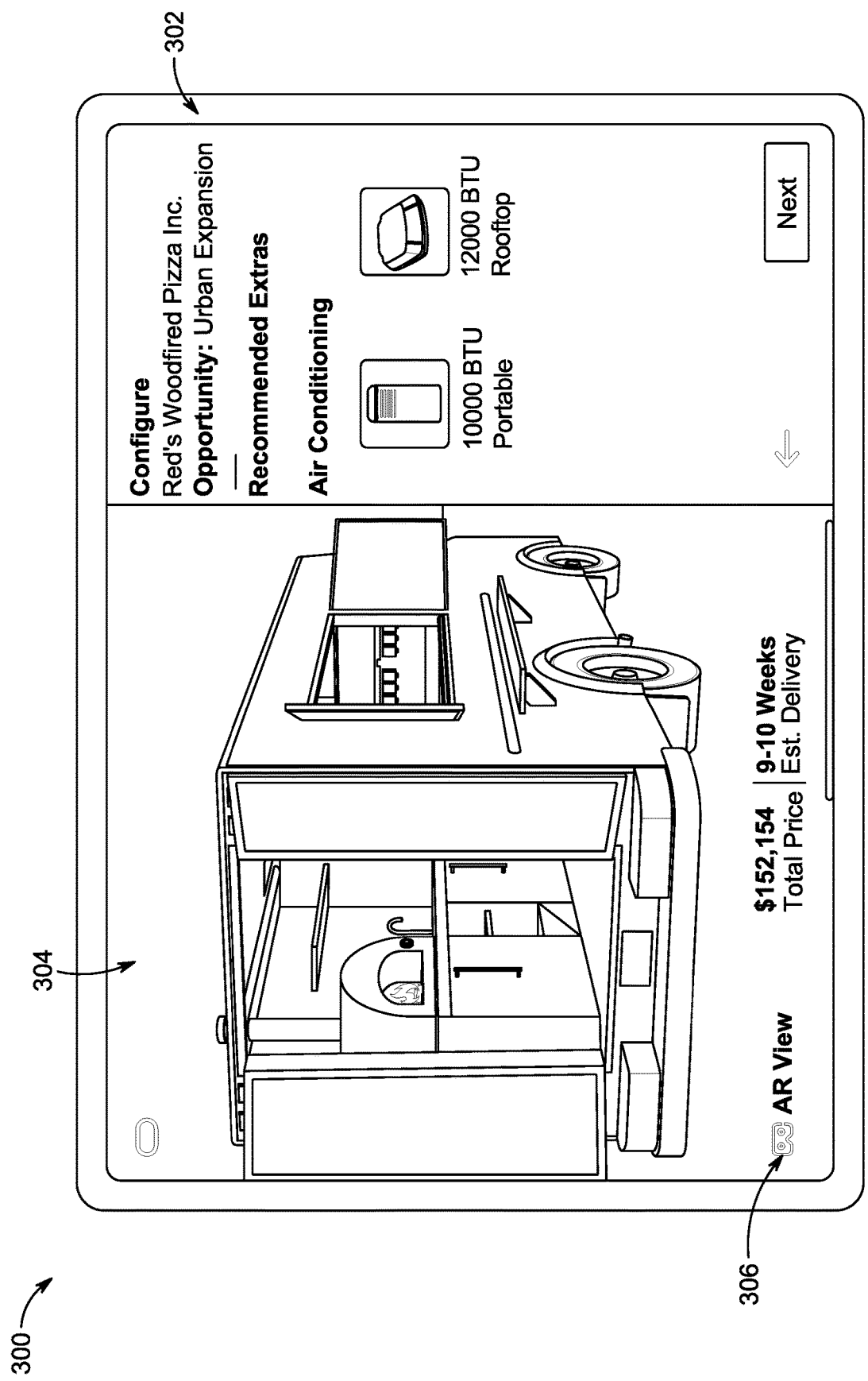

As shown in FIG. 3C, the user selects the woodfired pizza oven, and the machine learning CPQ system updates the preview area 304 to show the three dimensional space according to the selected layout, including the woodfired oven. Moreover, based on the user selecting the candidate layout including the woodfired oven, the system recommends adding an additional element of an air conditioner and displays the suggested candidate layout options in the input area 302. In particular, the air conditioner is suggested based on the increased heat output of the woodfired oven.

Figure 3D:
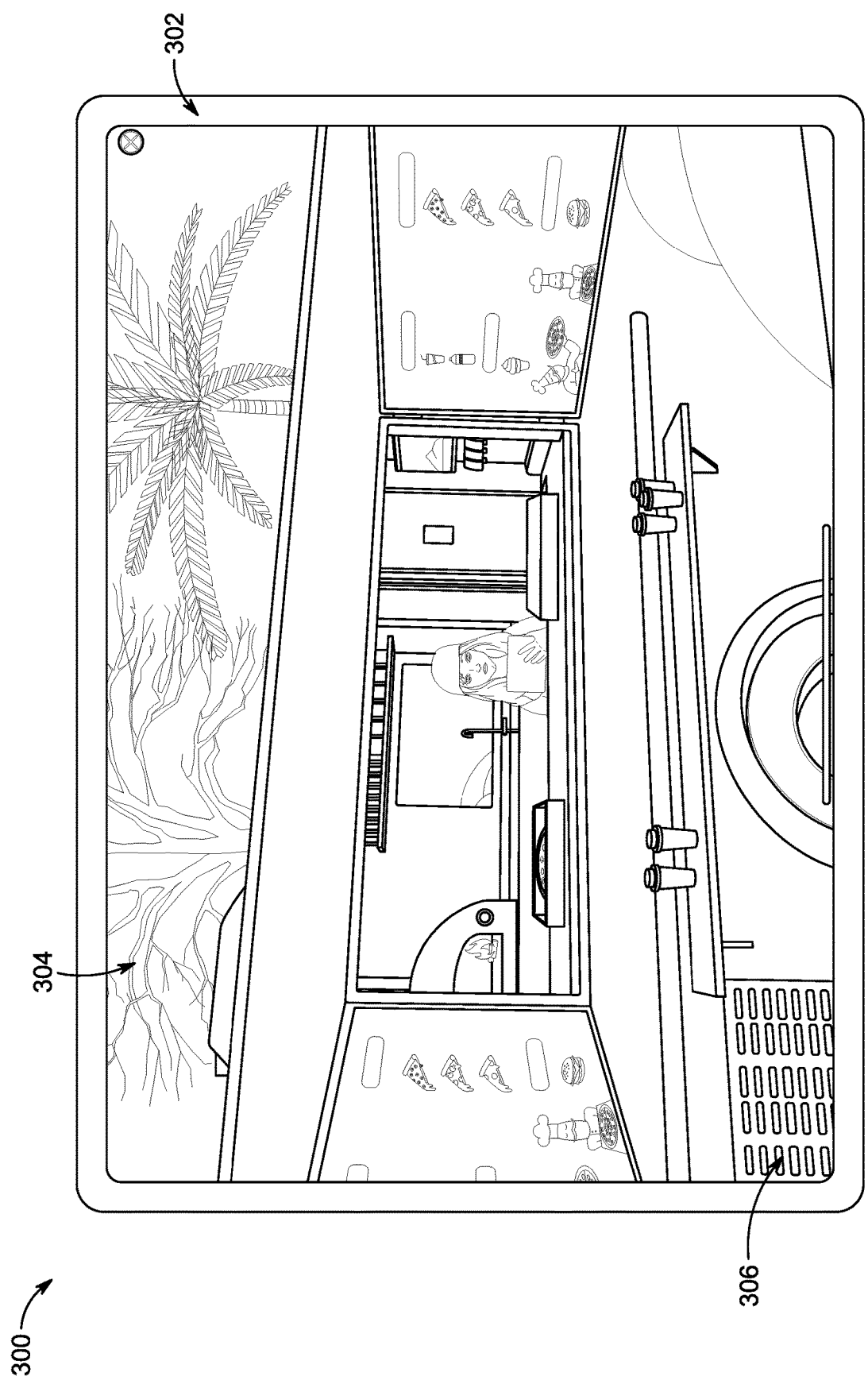

At any stage, the user can view an Augmented Reality (AR) rendering of the three dimensional space by clicking or otherwise activating the augmented reality control 306. The AR view may be output to a separate augmented reality display and/or provided on the display used to navigate the machine learning CPQ system. As shown in FIG. 3D, the Augmented reality view shows a rendering of the three dimensional space (e.g., the food truck) merged with real-life surroundings (e.g., a forest in which the virtual rendering of the food truck is positioned and a person standing within the virtual space. The rendered virtual food truck includes the equipment selected by the user in the layout. This allows the user to envision the scale of the food truck and the usability of the selected layout. As shown in FIG. 3D, the augmented reality display is presented on a tablet computer or similar display.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
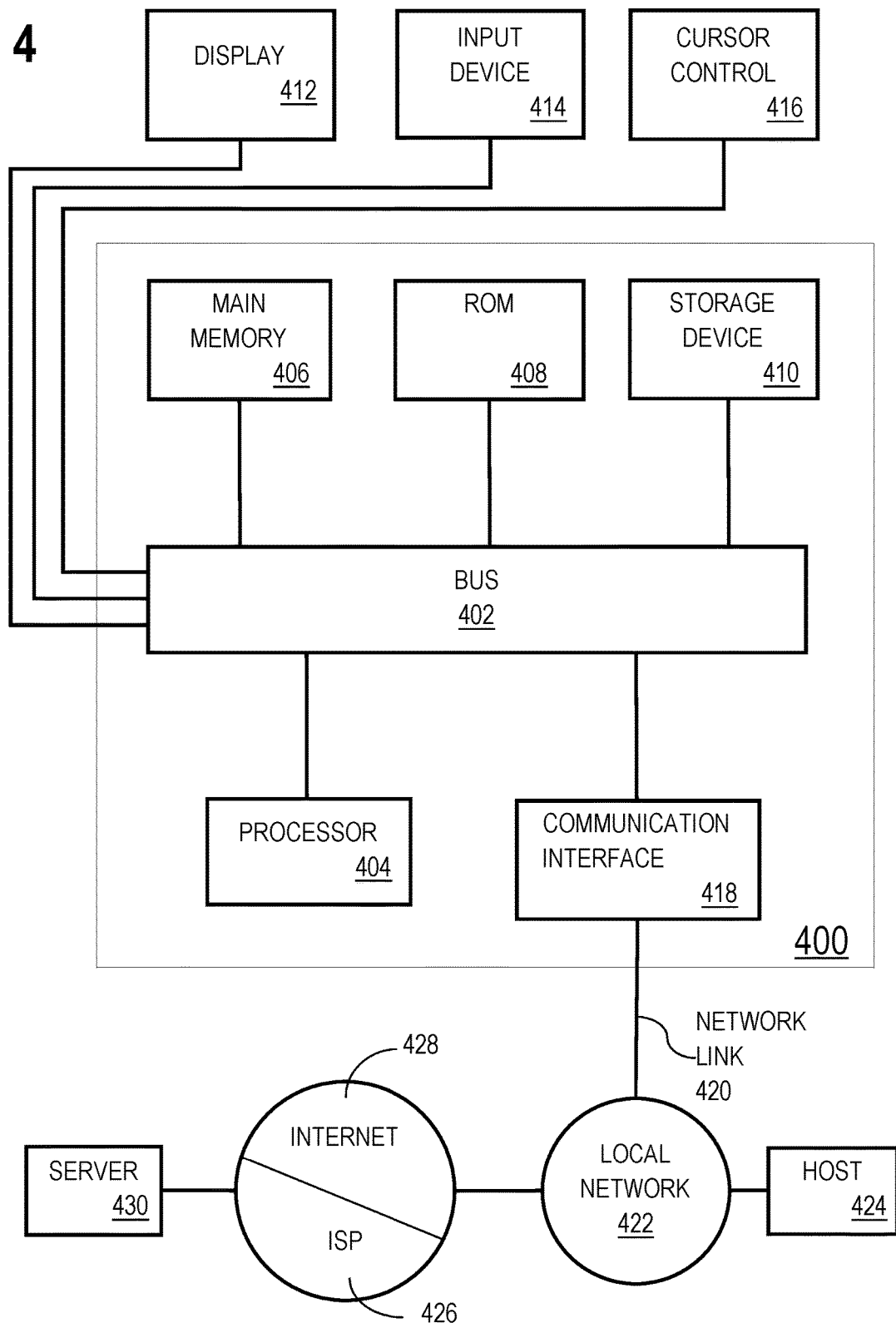
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other runtime-generated storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes runtime-generated memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its runtime-generated memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
   receiving a first request for a layout suggestion from a user, the first request including at least a first set of spatial characteristics for a first three-dimensional space;
   applying a machine learning model to the first set of spatial characteristics,
       wherein the machine learning model is trained to suggest layouts for three-dimensional spaces, including (a) information identifying one or more items to be included in the three-dimensional spaces and (b) for each item of the one or more items, location information specifying a location of the item within the three-dimensional spaces, and wherein the machine learning model identifies a first candidate layout as a suggestion;

generating an augmented reality (AR) graphical user interface (GUI) that presents a first representation of the first candidate layout in a virtual three-dimensional space, wherein the AR GUI comprises a rendering of at least one item in the first candidate layout merged with an image of real-world surroundings;

detecting, via one or more controls provided by the AR GUI, first user input to interact with the virtual three-dimensional space;

based at least in part on the first user input:
generating a second candidate layout comprising at least one difference from the first candidate layout based at least in part on the first user input;
updating the AR GUI to present a second representation of the second candidate layout in the virtual three-dimensional space.

2. The media of claim 1, wherein each set of historical data further comprises (c) an intended use of the particular structure, wherein the first request includes at least one intended use for the first three-dimensional space, and wherein applying the machine learning model comprises applying the machine learning model to the at least one intended use.

3. The media of claim 1, the operations further comprising:
receiving second user input specifying a size of a particular item, of the one or more items in the first candidate layout, the item being associated with a particular item category;
determining a candidate item associated with the particular item category, based at least in part on the size specified by the second user input;
recommending a candidate modification to the first candidate layout, the modification comprising replacing the particular item with the candidate item.

4. The media of claim 3, wherein the second user input specifies the size of the particular item on a continuous scale.

5. The media of claim 1, wherein the first representation of the first candidate layout in the virtual three-dimensional space comprises an extended reality representation of a structure having the first candidate layout.

6. The media of claim 5, wherein receiving the first user input to interact with the virtual three-dimensional space comprises monitoring user interactions with the extended reality representation of the structure having the first candidate layout.

7. The media of claim 6, wherein the first user input corresponds to one or more virtual movements through the virtual three-dimensional space.

8. The media of claim 1, the operations further comprising:
receiving, from the user, a modification to the first candidate layout;
presenting one or more candidate modifications based on the received modification, wherein the one or more candidate modifications comprise one or more of: (a) adding a particular piece of equipment that is not present in the first candidate layout, (b) removing a particular piece of equipment that is present in the first candidate layout, or (c) modifying a location of a particular piece of equipment that is present in the first candidate layout.

9. The media of claim 1, wherein the sets of historical characteristic data are associated with layouts from a single user.

10. The media of claim 1, the operations further comprising:
receiving, from the user, physical characteristic information indicating one or more physical traits of the user, wherein the sets of historical characteristic data are associated with layouts from a plurality of users, and wherein each user, of the plurality of users is selected based on the received physical characteristic information.

11. The media of claim 1, wherein the second candidate layout differs from the first candidate layout in one or more of: (a) adding a particular piece of equipment that is not present in the first candidate layout, (b) removing a particular piece of equipment that is present in the first candidate layout, or (c) modifying a location of a particular piece of equipment that is present in the first candidate layout.

12. The media of claim 1, the operations further comprising calculating a cost to purchase a structure comprising the three dimensional space having the first candidate layout.

13. The media of claim 1, the operations further comprising:
obtaining sets of historical characteristic data, each set of historical characteristic data comprising (a) spatial characteristics of a particular three-dimensional space including dimension information indicating a size of a particular three-dimensional space and (b) layout characteristics including information indicating items present in the particular three-dimensional space and positioning information indicating a position of each item within the particular three-dimensional space;
training the machine learning model based on the sets of historical characteristic data.

14. The media of claim 1, wherein the first user input comprises an instruction to change one or more structural elements of the first candidate layout.

15. A method, comprising:
receiving a first request for a layout suggestion from a user, the first request including at least a first set of spatial characteristics for a first three-dimensional space;
applying a machine learning model to the first set of spatial characteristics,
wherein the machine learning model is trained to suggest layouts for three-dimensional spaces, including (a) information identifying one or more items to be included in the three-dimensional spaces and (b) for each item of the one or more items, location information specifying a location of the item within the three-dimensional spaces, and
wherein the machine learning model identifies a first candidate layout as a suggestion;
generating an augmented reality (AR) graphical user interface (GUI) that presents a first representation of the first candidate layout in a virtual three-dimensional space, wherein the AR GUI comprises a rendering of at least one item in the first candidate layout merged with an image of real-world surroundings;
detecting, via one or more controls provided by the AR GUI, first user input to interact with the virtual three-dimensional space;
based at least in part on the first user input:

generating a second candidate layout comprising at least one difference from the first candidate layout based at least in part on the first user input;

updating the AR GUI to present a second representation of the second candidate layout in the virtual three-dimensional space, wherein the method is performed by at least one device including a hardware processor.

16. The method of claim 15, further comprising:

obtaining sets of historical characteristic data, each set of historical characteristic data comprising (a) spatial characteristics of a particular three-dimensional space including dimension information indicating a size of a particular three-dimensional space and (b) layout characteristics including information indicating items present in the particular three-dimensional space and positioning information indicating a position of each item within the particular three-dimensional space;

training the machine learning model based on the sets of historical characteristic data.

17. The method of claim 16, wherein each set of historical data further comprises (c) an intended use of the particular structure, wherein the first request includes at least one intended use for the first three-dimensional space, and wherein applying the machine learning model comprises applying the machine learning model to the at least one intended use.

18. A system, comprising:

at least one device including a hardware processor;

the system being configured to perform operations comprising:

receiving a first request for a layout suggestion from a user, the first request including at least a first set of spatial characteristics for a first three-dimensional space;

applying a machine learning model to the first set of spatial characteristics, wherein the machine learning model is trained to suggest layouts for three-dimensional spaces, including (a) information identifying one or more items to be included in the three-dimensional spaces and (b) for each item of the one or more items, location information specifying a location of the item within the three- dimensional spaces, and wherein the machine learning model identifies a first candidate layout as a suggestion;

generating an augmented reality (AR) graphical user interface (GUI) that presents a first representation of the first candidate layout in a virtual three-dimensional space, wherein the AR GUI comprises a rendering of at least one item in the first candidate layout merged with an image of real-world surroundings;

detecting, via one or more controls provided by the AR GUI, first user input to interact with the virtual three-dimensional space;

based at least in part on the first user input:

generating a second candidate layout comprising at least one difference from the first candidate layout based at least in part on the first user input;

updating the AR GUI to present a second representation of the second candidate layout in the virtual three-dimensional space.

19. The system of claim 18, the operations further comprising:

obtaining sets of historical characteristic data, each set of historical characteristic data comprising (a) spatial characteristics of a particular three-dimensional space including dimension information indicating a size of a particular three-dimensional space and (b) layout characteristics including information indicating items present in the particular three-dimensional space and positioning information indicating a position of each item within the particular three-dimensional space;

training the machine learning model based on the sets of historical characteristic data.

20. The system of claim 19, wherein each set of historical data further comprises (c) an intended use of the particular structure, wherein the first request includes at least one intended use for the first three-dimensional space, and wherein applying the machine learning model comprises applying the machine learning model to the at least one intended use.

* * * * *